United States Patent [19]
Sinclair et al.

[11] Patent Number: 5,200,065
[45] Date of Patent: Apr. 6, 1993

[54] TERTIARY WASTE TREATMENT AND DISPOSAL SYSTEM

[75] Inventors: John A. Sinclair; Thomas A. Sinclair, both of Lilburn, Ga.

[73] Assignee: Waste Water Systems, Inc., Lilburn, Ga.

[21] Appl. No.: 660,530

[22] Filed: Feb. 25, 1991

[51] Int. Cl.$^5$ .................... C02F 9/00; E02B 11/00; B01D 29/62

[52] U.S. Cl. .................... 210/104; 210/108; 210/143; 210/195.1; 210/258; 210/532.2; 405/37

[58] Field of Search ............... 210/108, 104, 143, 258, 210/277, 278, 393, 410, 411, 427, 170, 614, 618, 630, 123, 533, 532.2, 535, 798, 805, 167, 196, 195.1, 121; 239/542; 405/37

[56] References Cited

U.S. PATENT DOCUMENTS

| | | | |
|---|---|---|---|
| 3,425,936 | 2/1969 | Culp et al. | 210/108 |
| 3,920,550 | 11/1975 | Farrell, Jr. et al. | 210/104 |
| 4,251,359 | 2/1981 | Colwell et al. | 210/195.1 |
| 4,623,451 | 11/1986 | Oliver | 210/93 |
| 4,818,420 | 4/1989 | Mims | 210/108 |
| 4,986,905 | 1/1991 | White | 210/108 |
| 5,017,040 | 5/1991 | Mott | 210/170 |

Primary Examiner—Robert A. Dawson
Assistant Examiner—Sun Uk Kim
Attorney, Agent, or Firm—James A. Hinkle

[57] ABSTRACT

A waste water treatment and disposal system for further treating waste water effluent from a primary treatment system in which a system controller controls the operation of the system. A dosing tank accepts effluent from a primary treatment system and is evacuated on demand by a pump which is energized in response to a fluid level switch in the dosing tank. The pump forces the effluent through a filtering system to remove solid waste therefrom, and then forces a portion of the filtered effluent into a hydro-pneumatic pressure tank which, upon call, will backflush the filter to remove the trapped solids therein. The system controller will monitor the system to operate the level of the dosing tank, the operation of the pump and the various valves which control the flow throughout the system. The filtered effluent will ultimately be discharged into a disposal area by any number of well known methods. One such method may be by a dripper field in which the effluent is emitted through multiple drip emitters in a plurality of pipes laid underground. The system also has the capability of backflushing the dripper field to maintain the emitters open and operating.

2 Claims, 3 Drawing Sheets

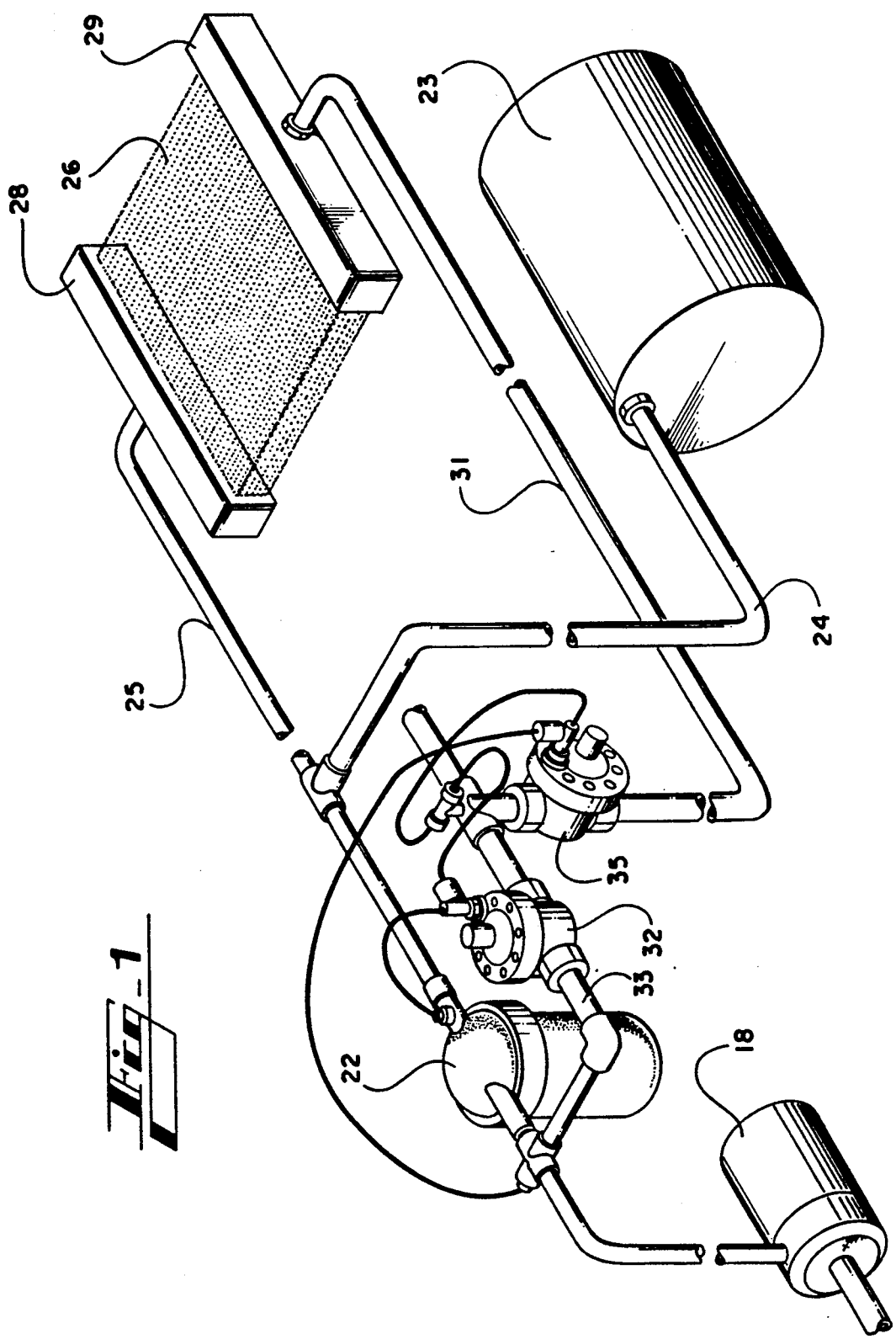

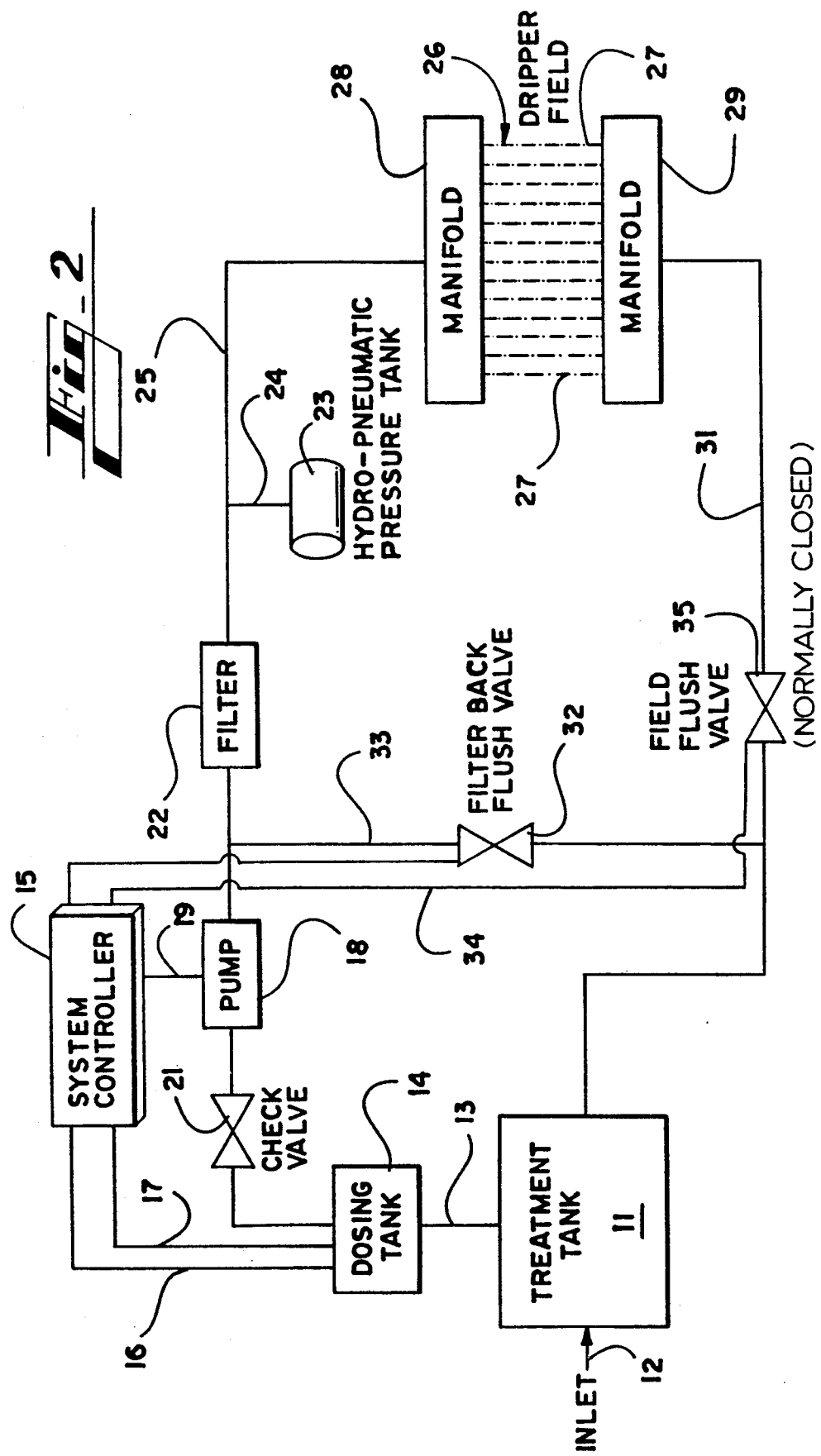
Fig_2

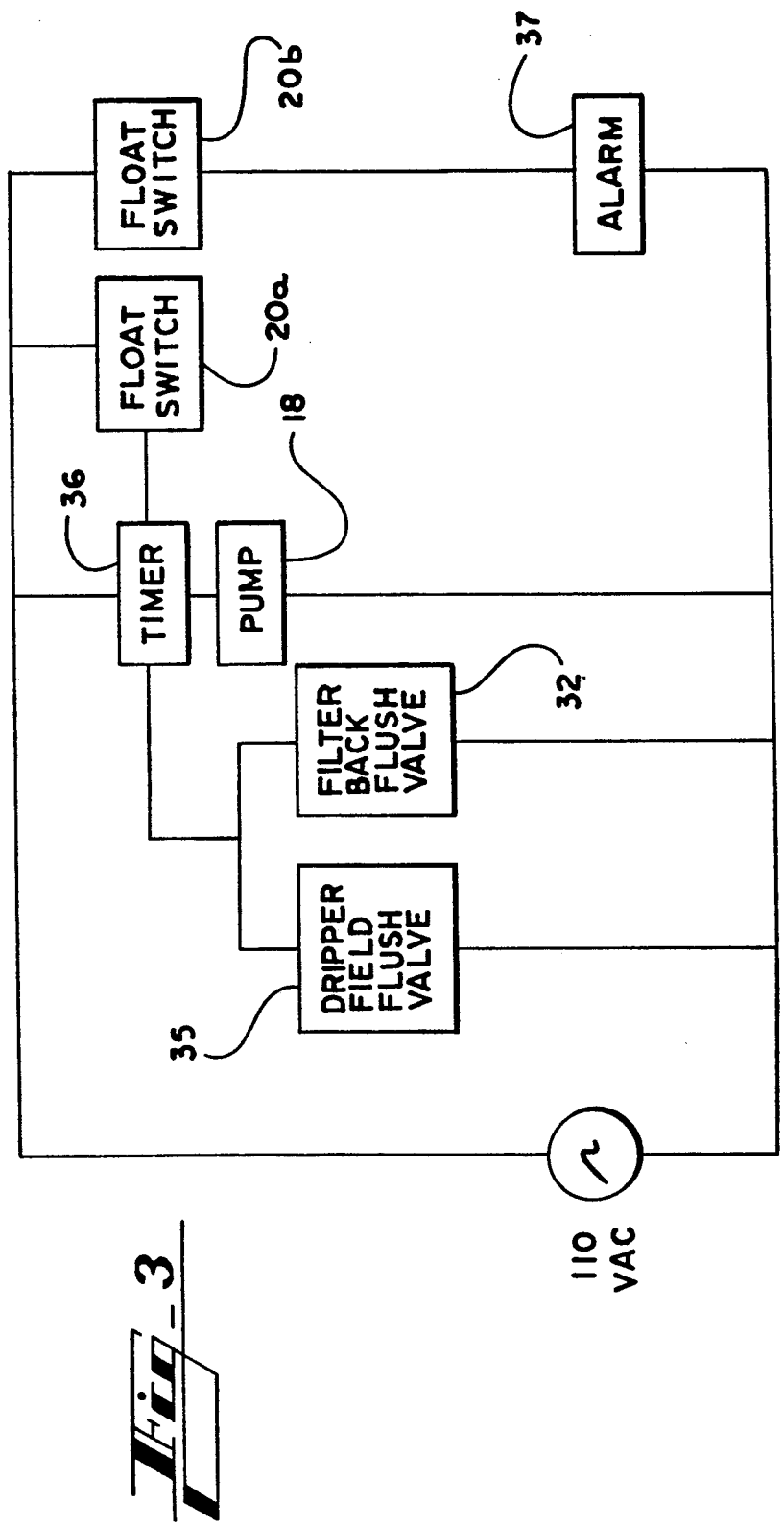
Fig_3

TERTIARY WASTE TREATMENT AND DISPOSAL SYSTEM

BACKGROUND OF THE INVENTION

I. Field of the Invention

The present invention relates to tertiary waste water treatment systems, and especially those treatment systems which are useful in treating waste water generated by single family dwellings, businesses and small industrial plants.

In the treatment of waste water there is often utilized a type of treatment plant which treats received waste product on an intermittent flow basis from the user of the system. In rural areas, it is normal that a user will utilize a buried sub-soil sewage treatment septic tank which is used to treat primary waste products. Such treatment systems are old and well-known in the art, and the septic tank normally receives the flow to be treated on an intermittent basis and then must treat the flow to meet health standards. Typically the septic tank does nothing more than remove a certain amount of solid waste from the waste water stream, and then transfers the waste water through a series of perforated pipes buried in a gravel receiving field in order that the waste water will flow from the perforated pipes into the gravel field and, subsequently, into the ground.

II. Description of the Prior Art

There have been advances over the well-known septic tank treatment system and these advances, which may or may not be feasible for a particular area, include land spray treatment systems, ground buried systems or point discharge systems in which the waste water is pre-treated.

In any system which further treats the waste water stream after leaving a holding tank, it is important and very desirable that a minimum of solid material remain in the waste water stream, especially if the waste water stream is going to be piped into a land spray system or into a buried drip application system. Both types of systems are easily clogged due to the small clearances of the discharge apparatus required for effective application.

SUMMARY OF THE INVENTION

The basic process of the present invention first starts with raw waste water entering into a septic type treatment tank system which normally functions as a anaerobic solids tank, or any other type of sewage treatment process.

In cases where surface discharge, land application or the use of drain fields are not acceptable, the present invention offers a unique tertiary filtering system followed by subsurface distribution of the waste water effluent. The proposed system is operated via a solid state controller which provides the following functions:
 (a) high water alarm
 (b) power out alarm
 (c) pump start control
 (d) time back flush of filter
 (e) automatic flushing of distribution system
 (f) remote monitor of alarm functions The system is activated by a sensing device located in a dosing tank. When activated by the level of effluent in the dosing tank it will start the pump which, in turn, will cause a normally opened hydraulically operated valve to close and allow the effluent to pass through a 1", 130 micron disc filter. The filter configuration is modular and can be amplified, or expanded, according to needs.

The filtered effluent is pumped through the system filling a hydro-pneumatic tank. The effluent is simultaneously discharged below the soil surface through a chemical resisting, pressure compensating "drip" poly tubing. The construction of the "drip" tubing is unique in that it provides for an exact amount of effluent to be discharged from each of its emitters along its entire length. Because the effluent is distributed at a relatively low rate, large quantities of effluent may be distributed over long periods of time without saturating the surrounding soil thus eliminating the possibility of runoff or surface water.

The automated backflush system is monitored by the controller and is activated by a timer circuit which is preset usually at five minute intervals, with a duration of 15 seconds. When the predetermined filtering time elapses, the valve which is now closed will open by virtue of the pump stopping, which in turn will cause the filtered effluent from the hydro-pneumatic tank to release at approximately 50 P.S.I. This will allow the pre-filtered effluent to reverse the flow through the filter creating the backflush and then discharge back into the treatment tank for reprocessing.

In amplified systems using multiple filters necessitated by larger flows, the hydro-pneumatic pressure tank may not necessarily be used due to sizing requirements for the pressure tank. It is anticipated that filtered water which has been through the filtering stage in such a situation may be backflushed through a filter to accomplish the cleaning.

The dripper lines will automatically flush every 200 dosing cycles. This function is activated through the controller which will open the field flush valve allowing the flushed effluent to be returned to the treatment tank. The duration of this cycle is three minutes.

In the event of a power outage or a high water condition in the dosing tank, an audio alarm will activate. Simultaneously, in an alternative method, a remote service center will be notified via phone line through a central computer. The maintenance company will respond within a designated time. Even in the event of power failure, the system is designed to provide at least an additional 200 gallons of capacity. If a service center is not provided, the alarm for the power outage or high water condition will notify the user of the potential problem.

When this improved system is used for distributing waste water, there are no visible indications that the installation site is being used for such purposes. This distribution system will permit waste water disposal in land areas that are also used for other purposes such as parks, athletic fields, groves, highway rights-of-way and even greenbelt areas around office buildings, trailer parks, and apartment complexes or residential subdivisions.

For existing or new treatment facilities, namely residential, commercial, industrial or municipal, our tertiary filtering and subsurface distribution system can be a viable alternative to land spray application techniques or direct discharge into streams, rivers or lakes.

In addition, as opposed to a typical gravity fed septic drain system, the pressurized drip emitting system for the effluent may be located in areas in which it is impossible to install septic drain fields. For instance, the drip emitting system when utilized with the present invention can be installed on extremely slopped areas, whether it be uphill or downhill, and may be utilized in soils which normally would not sustain a typical septic drain field.

Other objects, advantages and capabilities of the invention will become apparent from the following description taken in conjunction with the accompanying drawings, showing only a preferred embodiment of the invention.

BRIEF DESCRIPTION OF THE DRAWINGS

FIG. 1 is a perspective view of certain operative elements of the present invention;

FIG. 2 is a schematic diagram of the elements of the present invention; and

FIG. 3 is an electrical schematic diagram of the system controller.

DESCRIPTION OF THE PREFERRED EMBODIMENT

Referring to the drawings wherein like reference numerals designate corresponding parts throughout the several figures, and referring especially to FIG. 2 showing a schematic of the entire system, the process generally will commence with waste water flowing into the treatment tank 11 at inlet 12. The treatment tank may be of any suitable type, such as a standard septic system tank which acts as an anaerobic holding tank, or it may be an aeration system providing aerobic treatment to the waste water stream, or any other type of treatment system.

From the treatment tank 11 the effluent then traverses through suitable piping 13 to the dosing tank 14, which receives the effluent on demand of the system. The dosing tank, in conjunction with the system controller 15, controls and provides waste water effluent to the entire system. The level of effluent in the dosing tank is sensed by the system controller 15 through a float switch 20a within the dosing tank and sensed through electrical control line 16. Should the dosing tank become filled excessively with waste water, a high water alarm is provided to the system controller and a second float switch identified by numeral 20b, is enclosed in the dosing tank and monitored by the system controller 15 through electrical sensing line 17 in order to provide an alarm to the user of the system, when the alarm 37 is activated, that there is a potential problem due to high water within the dosing tank, thereby indicating a malfunction within the system. An electrical diagram of the system controller 15 is shown in FIG. 3, wherein the controller is supplied with a suitable source of electrical energy. The source may be 110 VAC, or it may be battery powered depending upon the circumstances and the nature of use of the controller.

As the system controller senses the proper level of water within the dosing tank through float sensing line 16, the controller will turn on the pump 18 through electrical connection 19. At this point, the pump evacuates the dosing tank to a required level thereby drawing waste water from the dosing tank through the one-way check valve 21. The effluent is passed through filter 22 and through flow line 24 thereby filling the hydropneumatic pressure tank 23.

Once the tank 23 is filled and pressurized, the effluent then traverses through flow line 25, to the dripper field 26, which is shown schematically in FIG. 2. For proper distribution through the drip emitting tubes 27, the effluent flows into an upper manifold 28 and thence through the dripper tubes 27, and then out through the individual emitters (not shown) into the ground.

In operation of the present system, and as previously noted, when the waste water level in the dosing tank reaches a pre-determined level the timer 36 of system controller will turn on pump 18 thereby evacuating the dosing tank, forcing the effluent through filter 22 to filter out remaining solids, and pressurizing the hydropneumatic pressure tank 23 and thence forcing the effluent through the emitters in the dripper field 26. Typically the pump will run on a timed cycle as is indicated by the demand and operating characteristics of the system. The typical cycle may be for 5 minutes, at which time the pump would then be cut off by the timing mechanism 36 within the system controller 15. At this point, the pump would cease operation and system controller 15 would open the filter backflush valve 32 allowing the evacuation of the hydropneumatic pressure tank 23 in a backwash mode through filter 22, thereby cleaning any trapped solids from within the filter and thence forcing the backflush water through flow line 33 and ultimately back into the treatment tank 11. After a timed backflush cycle, the system controller will then close the backflush valve 32 and the system is once again readied for accepting effluent from dosing tank 14.

In order for the dripper field 26 to properly operate, and since the emitters from the drip lines 27 have relatively small apertures, there is a possibility that the apertures could become clogged over a period of use. The present invention contemplates a method by which the dripper emitters may be flushed of any trapped solids to maintain the emitters in an open and operating condition. This is accomplished on a timed cycle, while pump 18 is operating and forcing effluent into manifold 28, by the system controller 15 signalling by means of electrical connector 34, field flush valve 35 to open thereby allowing a rapid and substantial movement of effluent through the dripper field lines 27 through flow line 31 and, subsequently, into the treatment tank 11. The rapid flow of effluent through lines 27 of the dripper field 26 and through lines 27, will create substantial turbulence throughout the lines 27 and ultimately will remove impacted solids from the emitters of the dripper lines 27. Typically, the cycle for the field flush valve will be approximately 3 minutes and it has been found that this type of a cycle will adequately maintain the emitters and the dripper field in an operating condition. Once the field flush cycle is completed, the system controller will then close valve 35 and the system will once again begin to operate in the normal intended discharge mode.

At such times as the dripper emitters in the dripper field 26 are flushed upon opening of the field flush valve 35 and the rapid and substantial movement of the effluent through the dripper field lines 27, the effluent is typically collected at a central point for transportation through the field flush valve 35 and into the treatment tank 11. A schematic of this system is shown in FIG. 2, wherein manifold 29 is a collection point for the effluent to be channeled into line 31. Manifold 29, however, is not necessarily a manifold in the sense that manifold 28 is, but manifold 29 is a convenient term to use for a point where all of the dripper field lines 27 meet to tie into line 31. The field flush valve 35 in order to be effective, should be located somewhere between treatment tank 11 and the downstream end of dripper field 26. For convenience in a normal system, valve 35 would be located after the dripper field lines 27 are merged to the flow line 31. However, it should be noted that field flush valve 35 could be installed in multiple numbers, and each dripper field line 27 could have a field flush valve with that particular line. However, as previously noted, most systems would have just one field flush valve to handle the entire dripper field 26, which valve would be at the downstream end of the dripper field 26.

The tertiary treatment system of the present invention, as has been indicated, is preferably used with a subsurface drip irrigation system installed at an adequate depth below the soil surface. The depth of installation is dependent upon factors such as soil type and land usage. The system would be so installed and set for flow rates and spacing of emitters in the dripper field wherein, under normal conditions, the possibility of ground water and surface contamination is eliminated.

It has been found that in a typical residential environment, a waste water treatment system with a 500 gallon per day treatment capacity will be sufficient. For this system, the maximum flow rate is typically estimated at 180 gallons per hour and this will require a disposal system of approximately 300 emitters with each emitter having a flow rate of 0.6 gallons per hour. Therefore, the spacing of the emitter and the depth of installation will depend upon usage rates, soil conditions, land usage above the dripper field and frost line considerations. It has been found that, for certain soil types, certain emitter spacing and geometry may be as suggested in Table 1.

TABLE 1

Guidelines for Emitter Installation for Treated Water Disposal According to Environmental Conditions (Emitter Flow = 0.6 gallons/hour)

| Conductivity of Soil (min./in.) | Emitter on Lateral (inch) | Spacings Between Laterals (inch) | Irrigation Rate (Water Consumption) (inch/hr.) | Number of Emitters at 500 gal./day | Disposal Area (feet) | Emitter Depth (inch) |
|---|---|---|---|---|---|---|
| 600 | 36 | 36 | 0.11 | 870 | 7830 | 10-20 |
| 300 | 24 | 36 | 0.16 | 542 | 3252 | 8-16 |
| 120 | 24 | 24 | 0.24 | 323 | 1292 | 8-16 |
| 60 | 24 | 24 | 0.24 | 323 | 1292 | 6-12 |

The present system is especially useful in an agricultural environment and, if properly operated, the irrigation system has the benefit of reducing the need for artificial fertilization of crop areas. The system can be operated automatically year around, and is flexible enough to be adapted to different loadings, soil conditions and plants. If the load upon the system increases, the dripper field 26 may be increased to accept the increase loading without major renovation of the entire system. Such is not possible with a typical septic system of the prior art. As is evident, the present system is relatively inexpensive and is adapted to a wide range of environments and soil conditions, not normally acceptable with current septic type systems.

Various modifications may be made of the invention without departing from the scope thereof and it is desired, therefore, that only such limitations shall be placed thereon as are imposed by the prior art and which are set forth in the appended claims.

What is claimed is:

1. A waste water treatment system for further treating waste water effluent from a primary treatment system, comprising:

a system controller means to control the operation of the treatment system, a dosing tank means for accepting the effluent and providing a downstream flow of effluent, means for pressurizing fluid flow downstream from the dosing tank means and throughout the treatment system, the dosing tank means having at least one float switch within the dosing tank means connected to the system controller means to activate the means for pressurizing fluid flow downstream from the dosing tank means, means for filtering waste material from the downstream flow of effluent, the means for pressurizing fluid flow comprising a pump connected in-line between the dosing tank means and the filtering means, backflush pressure means for accepting filtered effluent from the filtering means to subsequently backflush the filtering means at intervals of time, wherein the backflush pressure means comprises a hydropneumatic tank to store filtered effluent until the system controller means causes the stored filtered effluent to flow from the hydropneumatic tank back through the filtering means to thereby remove filtered waste from the filtering means, wherein the filtering means comprises a filter in-line between the pump and the hydropneumatic tank, a plurality of fluid flow tubes to accept the filtered effluent, the tubes having emitting means and discharge means to effect the discharge of the filtered effluent into a ground environment comprising field flush valve means downstream from the means to discharge the filtered effluent through the emitting means, the system controller means providing a signal at selected intervals to operate the pump and to open the field flush valve means thereby creating a forceful turbulent fluid flow through the fluid flow tubes effecting a cleaning of the emitting means and subsequently causing the filtered effluent to flow into the primary treatment system for reprocessing.

2. A waste water treatment system for further treating waste water effluent from a primary treatment system, comprising:

a system controller means to control the operation of the treatment system, a dosing tank means for accepting the effluent and providing a downstream flow of effluent, pump means for pressurizing fluid flow downstream from the dosing tank means and throughout the treatment system, means for filtering waste material from the downstream flow of effluent, backflush pressure means for accepting filtered effluent from the means for filtering waste material to subsequently backflush the means for filtering waste material at intervals of time, means to effect the discharge of the filtered effluent into a ground environment, wherein the means to effect the discharge of the filtered effluent comprises a manifold to distribute the filtered effluent to a plurality of fluid flow tubes, the tubes having emitted means to discharge the filtered effluent to the ground environment at controlled rates, wherein field flush valve means are provided downstream from the means to discharge the filtered effluent, the system controller means providing a signal at selected intervals to operate the pump means and to open the field flush valve means thereby creating a forceful turbulent fluid flow through the fluid flow tubes effecting a cleaning of the emitting means and subsequently causing the filtered effluent to flow into the primary treatment system for reprocessing.

* * * * *